March 14, 1933.　　　　W. MULLER　　　　1,901,115
PREPARATION OF BREAD AND THE LIKE FOR WRAPPING
Filed April 24, 1930　　　2 Sheets-Sheet 1
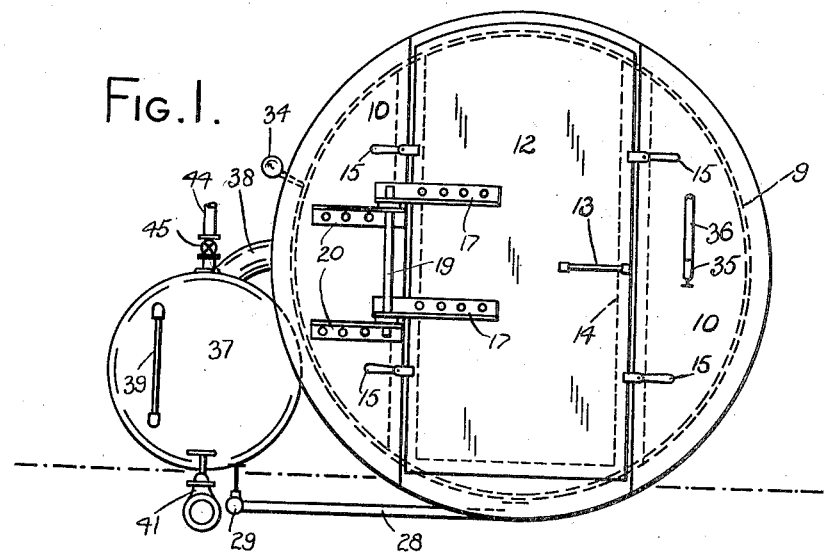
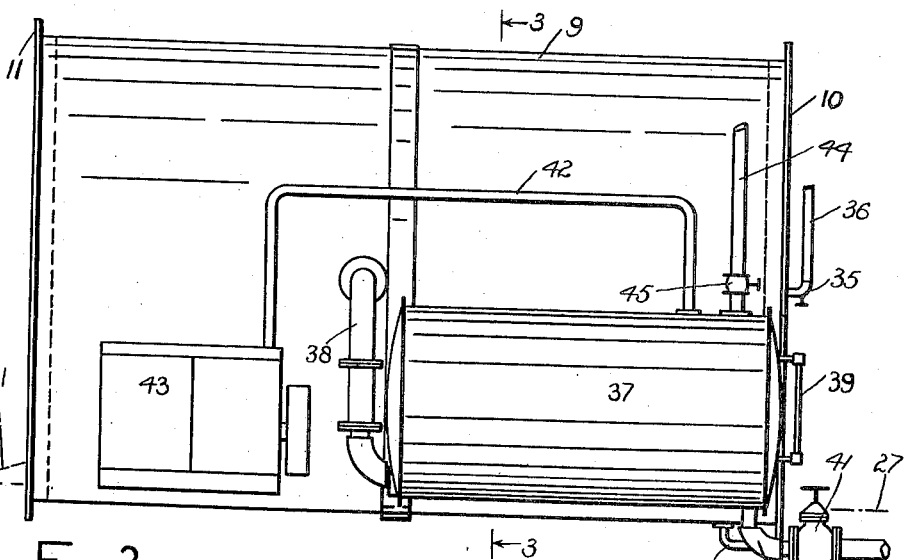
Inventor.
WILHELM MULLER March 14, 1933.  W. MULLER  1,901,115
PREPARATION OF BREAD AND THE LIKE FOR WRAPPING
Filed April 24, 1930  2 Sheets-Sheet 2
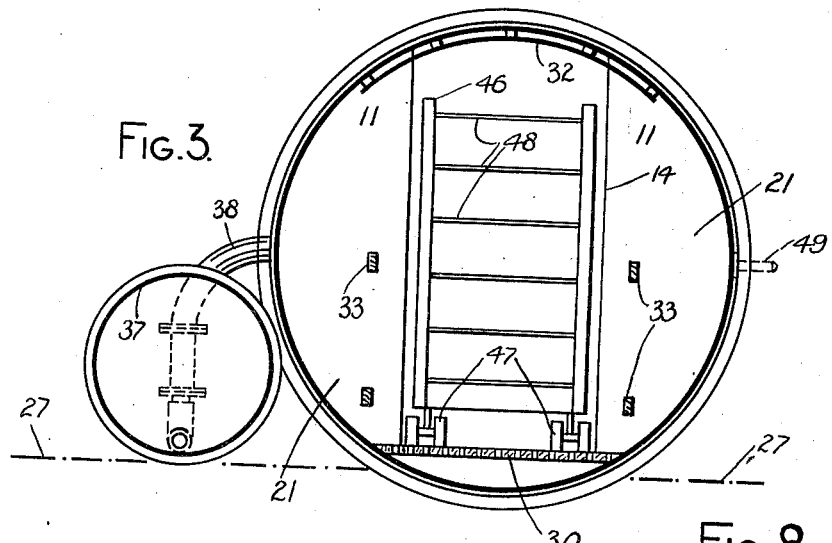
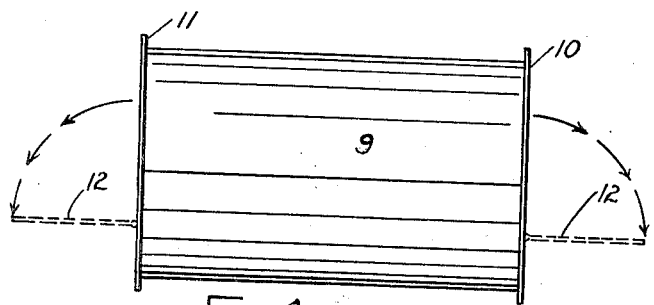
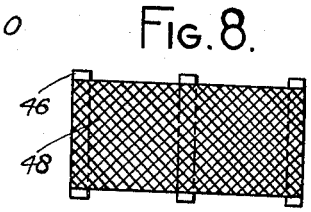
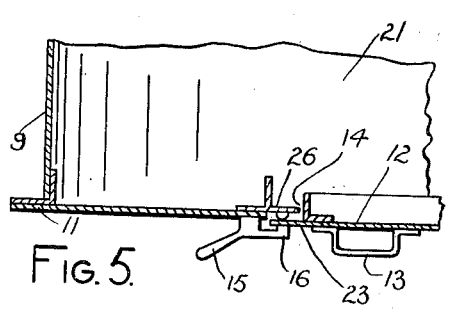
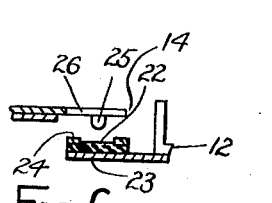
Inventor
WILHELM MULLER
BY
ATT'YS Patented Mar. 14, 1933

1,901,115

UNITED STATES PATENT OFFICE

WILHELM MULLER, OF ENFIELD, NEAR SYDNEY, NEW SOUTH WALES, AUSTRALIA, ASSIGNOR OF ONE-THIRD TO AUTOMATIC BREAD BAKING COMPANY LIMITED AND ONE-THIRD TO FRANCIS HAWKINS, BOTH OF SYDNEY, AUSTRALIA

PREPARATION OF BREAD AND THE LIKE FOR WRAPPING

Application filed April 24, 1930, Serial No. 447,074, and in Australia June 6, 1929.

Heretofore in the wrapping of bread for hygienic delivery considerable trouble has been experienced in ridding the freshly baked bread of superfluous moisture before wrapping, otherwise the bread becomes sodden, and many experiments have been tried to overcome this difficulty but without success. Now this invention has been specially devised to obviate the before mentioned difficulties, and to provide comparatively simple and effective means whereby the superfluous moisture is quickly extracted or driven off from the freshly baked bread in any desired quantity, and the treated bread is then suitable for immediate wrapping before its freshness is affected.

According to this invention the freshly baked bread is placed in a chamber wherein it is subjected to the action of a vacuum of predetermined degree which removes the superfluous moisture in the form of steam or vapour from the bread.

In one practical method of carrying this invention into effect wheeled racks or trucks are constructed wherein the bread is adapted to be packed fresh from the oven and wherein the surface of said bread is well exposed for the vacuum action. These racks are on wheels or runners or the like so that they can be readily removed from adjacent the ovens to within the vacuum chamber.

The vacuum chamber is of any convenient size and shape and of suitable strength and material to withstand the pressures to which it is or may be subjected, without danger or collapse. It is fitted with one or more air tight doors together with pressure release and drainage means, and usual fittings and control devices, and has one or more connexions to a vacuum pump or other suitable source.

Although a vacuum pump is very suitable for removing the moisture from the bread in the chamber, a steam or water ejector, or any known means of chamber exhaustion may be employed with good results.

When a vacuum pump is employed a condenser is connected to the chamber for removing the steam or moisture therefrom.

In order to further describe the invention reference will be made to the annexed drawings wherein a practical application of the invention is shown more or less schematically:—

Fig. 1 is a front elevation of the complete apparatus.

Fig. 2 is a side elevation and,

Fig. 3 a transverse section of same on the line 3—3 in Fig. 2.

Fig. 4 is a plan of the chamber, to show the method of opening of the doors.

Fig. 5 shows an enlarged sectional detail of the method of closure of the doors.

Fig. 6 is a detail of the means adopted for air tight closure of the doors, and

Fig. 7 is a detail of the hinging of the doors, while

Fig. 8 is a plan of a bread conveying truck.

It is preferred to build the chamber of metal plate, and it consists of a cylindrical portion 9 of steel plate reinforced where required, and arranged to withstand safely a pressure of at least 15 lbs. per square inch. There are front and rear walls 10 and 11, each having a door 12 (with handle 13) hinged thereto, and adapted to air-tightly close doorways 14 therein, and having lever door fastenings 15 (see Fig. 5) pivoted to the end walls 10 and 11 and having an engaging head 16 to take over the door edges and draw same tightly in.

The door hinges consist of angle bars 17 mounted upon each of the doors 12, and having an elongated slot 18 therein which fits over a hinge pin 19 supported from each of the end walls 10 and 11 by brackets 20, so that the said doors 12 have play adjustment on their hinges to close tightly upon a more or less resilient flange provided thereon as later described.

The doors 12 are both adapted to open outwardly in the same direction as seen in Fig. 4 so as to provide a direct passage through the interior 21 of the vacuum chamber; and to ensure the air tight closure of the said doors 12 a resilient flange 22 of rubber or other suitable material is provided around the edge 23 thereof retained in place by keeper straps 24. A beading or ribbing 25 is also provided upon the surrounding flange 26 or the doorways 14 and is positioned to bed into the rubber flange 22 when the doors 13 are closed, and thus establish an air tight joint.

This vacuum chamber 9—21 is set at a convenient height in say a concrete foundation, the floor line 27 of which is shown in chain lines, and it is sloped or canted slightly to one point, say the forward end for drainage purposes, and has a drain pipe 28 with control cock 29, and discharge leading to where desired. Across the chamber interior 21 a flooring 30 is arranged at or about the surrounding ground or floor level 27, and this flooring 30 is conveniently in the form of slats to permit of effective drainage. Should it not be convenient to have the flooring 30 level with the general ground or floor alignment, removable ramps 31 as shown in dotted lines in Fig. 2, may be used when the doors 12 are open. Across the top of the chamber interior 21 a cloth or absorbent lining 32 is arranged to prevent condensed moisture from dropping upon the bread or other articles placed in the chamber 9—21, and there may also be a guide frame 33 provided longitudinally of the said chamber 9—21, to direct trucks or the like through the interior 21, and to prevent same from jambing or colliding with the sides.

A vacuum gauge 34 and a pressure release valve 35 are provided on the chamber front wall 10 and the said valve 35 preferably has a length of pipe 36 attached thereto to lead its intake end above reach of operators for safety purposes.

A condenser 37 is affixed at one side of the vacuum chamber 9—21, and is connected thereto by pipe 38, and there is a water gauge 39, and a drain outlet 40 with cock 41, and connexion 42 to a vacuum pump of usual construction and suitable capacity, and having necessary pipe lines and fittings as well understood. There may also be a water inlet 44 provided with control valve 45.

A hot air intake 49 (see Fig. 3 for position) may if required be arranged on the chamber 9—21.

If desired the bread may be conveyed into the vacuum chamber 9—21 either by rail or by carriers on a mono-rail or packed therein on shelves or otherwise as desired but in the present case special trucks or frames 46 (see Fig. 8) are provided with swivelling wheels 47, and vertically adjustable open wire shelves 48 across the framing, and these trucks are adapted to be wheeled into the chamber interior 21 loaded with bread, and the wire shelves 48 permit free action of the vacuum upon the bread.

In use the bread freshly baked from the ovens is first loosely packed upon the shelves 48 of the trucks 46 so that the surfaces of said bread are freely exposed for the vacuum action thereupon. The trucks 46 are wheeled into the interior of the vacuum chamber 21 from one or both ends through the doorways 14, and when the said chamber is loaded the doors 12 are closed and locked by the lever fastenings 15 and then the vacuum pump 43 is started. As the exhaustion of the vacuum chamber 9—21 proceeds the doors 12 are drawn tightly inwardly upon the rubber flanges 22 and it will be seen that the lever fastenings 15 drop downwardly out of engagement, and said doors 12 are very firmly and air tightly retained closed by the vacuum action alone. When the gauge shows an indication of from 10 to 15 the pump 43 is stopped, and the release valve 35 opened to relieve the vacuum. The bread then may be removed and it will be found that the superfluous moisture is removed from said bread.

It is to be understood that the extent of vacuum or exhaustion of the chamber may be varied to suit different requirements and is not limited to the precise figures set out above. Furthermore the construction of the apparatus may also be varied as desired without departure from the nature and scope of this invention.

I claim:

In and for the preparation of bread and the like for wrapping a vacuum chamber comprising a cylindrical shell with end walls having doorways, airtight doors hingedly mounted upon said end walls and having fastenings, a flooring, a moisture screen arranged across the top of the said chamber, a drainage pipe with suitable control cock, a pressure release valve and gauge, a condenser connected by pipe to said vacuum chamber and having a gauge glass, and drainage pipe with control cock and vacuum inducing means coupled to said condenser.

WILHELM MULLER.